US009663698B2

(12) United States Patent
Yoshinari et al.

(10) Patent No.: US 9,663,698 B2
(45) Date of Patent: May 30, 2017

(54) COLD AND HEAT STORAGE AGENT COMPOSITION

(71) Applicants: KYODO YUSHI CO., LTD., Fujisawa-shi (JP); DENSO CORPORATION, Kariya-shi (JP)

(72) Inventors: Terasu Yoshinari, Chigasaki (JP); Minoru Namiki, Chigasaki (JP); Koji Sakakibara, Yatomi (JP); Atsushi Yamada, Anjo (JP); Shozo Ikejima, Okazaki (JP)

(73) Assignees: KYODO YUSHI CO., LTD., Kanagawa (JP); DENSO CORPORATION, Aichi (JP)

( * ) Notice: Subject to any disclaimer, the term of this patent is extended or adjusted under 35 U.S.C. 154(b) by 206 days.

(21) Appl. No.: 14/377,558

(22) PCT Filed: Feb. 15, 2013

(86) PCT No.: PCT/JP2013/053722
§ 371 (c)(1),
(2) Date: Aug. 8, 2014

(87) PCT Pub. No.: WO2013/122212
PCT Pub. Date: Aug. 22, 2013

(65) Prior Publication Data
US 2016/0024364 A1 Jan. 28, 2016

(30) Foreign Application Priority Data
Feb. 15, 2012 (JP) .................. 2012-030441

(51) Int. Cl.
*C09K 5/06* (2006.01)
(52) U.S. Cl.
CPC ............. *C09K 5/066* (2013.01); *C09K 5/063* (2013.01); *Y02E 60/147* (2013.01); *Y02E 70/30* (2013.01)

(58) Field of Classification Search
CPC ......... C09K 5/066; C09K 5/063; Y02E 70/30; Y02E 60/147
See application file for complete search history.

(56) References Cited

U.S. PATENT DOCUMENTS

| | | | |
|---|---|---|---|
| 2002/0002837 A1 | 1/2002 | Shirota et al. | |
| 2003/0046944 A1 | 3/2003 | Kitamura et al. | |
| 2007/0142247 A1* | 6/2007 | Baillargeon | C10M 169/04 508/279 |
| 2010/0133464 A1* | 6/2010 | Tomura | C09K 5/063 252/70 |
| 2011/0101280 A1* | 5/2011 | Motoyama | C10M 141/08 252/401 |

FOREIGN PATENT DOCUMENTS

| | | | |
|---|---|---|---|
| JP | 5-039479 A | | 2/1993 |
| JP | 05039479 | * | 2/1993 |
| JP | 6-234967 A | | 8/1994 |
| JP | 2002-337537 A | | 11/2002 |
| JP | 2002337537 | * | 11/2002 |
| JP | 2003-080933 A | | 3/2003 |
| JP | 2006-321949 A | | 11/2006 |
| JP | 2011-051393 A | | 3/2011 |
| JP | 2011051393 | * | 3/2011 |

OTHER PUBLICATIONS

International Search Report (PCT/ISA/210) mailed on May 21, 2013, by the Japanese Patent Office as the International Searching Authority for International Application No. PCT/JP2013/053722.
Written Opinion (PCT/ISA/237) mailed on May 21, 2013, by the Japanese Patent Office as the International Searching Authority for International Application No. PCT/JP2013/053722.

* cited by examiner

Primary Examiner — Emmanuel Duke
(74) Attorney, Agent, or Firm — Buchanan, Ingersoll & Rooney PC

(57) ABSTRACT

The invention provides a cold and heat storage agent composition containing paraffin as a base material and at least one selected from the group consisting of organic inhibitors and passivators as a hydrogen generation inhibitor.

13 Claims, No Drawings

COLD AND HEAT STORAGE AGENT COMPOSITION

TECHNICAL FIELD

The present invention relates to a cold and heat storage agent composition that can be used for a cold and heat storage type air-conditioning apparatus.

BACKGROUND ART

For the purpose of environmental protection, economical running (Eco-Run) vehicles and hybrid vehicles have lately been put to practical use, which automatically suspend the engine while stopping and waiting for the stop signal to change (i.e., while the engine power is unnecessary).

In the air-conditioning apparatus for vehicles, the compressor in the refrigerating cycle is driven by engine power of the vehicle. Therefore, every time the engine of the hybrid vehicle or the like stops at a red light, for example, the compressor is also stopped to increase the temperature of the heat exchanger for cooling (i.e., the evaporator). This will consequently increase the temperature of air blown into the vehicle cabin, which unfavorably produces the problem of impairing cool feeling of the people in the cabin.

JP 2002-337537 A proposes a cold-storage type air-conditioning apparatus for vehicles, which is equipped with a cold storage unit capable of storing cold energy while the compressor is operating, thereby making it possible to cool the air blown from the cooler into the vehicle cabin even when the compressor is stopped (i.e., when the operation of the heat exchanger for cooling is stopped).

It is also known from JP (Hei) 06-234967 A, JP 2003-80933 A, JP 2006-321949 A and JP 2011-51393 A that the cold storage agent for cold-storage type aid-conditioning apparatus employs normal paraffin that can exhibit stable melting and solidification behaviors for an extended period of time and large latent heat.

SUMMARY OF INVENTION

Technical Problem

In the cold-storage type air-conditioning apparatus for vehicles as mentioned above, a case used for the cold and heat storage unit is often made from an aluminum sheet material in consideration of the factors such as heat transfer, weight reduction and the like. The problems therefore caused in practice are rust gathered on the aluminum case, and at the same time, expansion and other deformation of the aluminum case due to hydrogen generated. No effective countermeasure has been taken against the above-mentioned problems.

In light of the above, an object of the invention is to provide a cold and heat storage agent composition that can prevent the case from rusting and deforming, with the latent heat of melting being kept unchanged.

Solution to Problem

As a result of extensive studies to solve the above-mentioned problems, the inventors of the present invention found that when a particular hydrogen generation inhibitor is incorporated into normal paraffin serving as a base material, it is possible to obtain a cold and heat storage agent that can prevent the aluminum case from gathering rust and from deformation due to generate hydrogen, with the latent heat of melting being not decreased, which is remarkably important characteristics of the cold and heat storage agent.

Accordingly, the invention provides a composition shown below, and an air-conditioning apparatus for vehicles which is equipped with an aluminum-cased cold storage unit where the composition is enclosed.

1. A cold and heat storage agent composition comprising paraffin as a base material and at least one member selected from the group consisting of organic inhibitors and passivators as a hydrogen generation inhibitor.

2. The cold and heat storage agent composition described at item 1, wherein the base material is at least one member selected from the group consisting of normal paraffins having 12 to 18 carbon atoms.

3. The cold and heat storage agent composition described at item 2, wherein the base material is at least one member selected from the group consisting of normal paraffins having 14 to 16 carbon atoms.

4. The cold and heat storage agent composition described at claim 3, wherein the base material comprises the normal paraffin having 15 carbon atoms in an amount of 60 mass % or more based on the total mass of the base material.

5. The cold and heat storage agent composition described at any one of items 1 to 4, wherein the hydrogen generation inhibitor is at least one member selected from the group consisting of amine salts, carboxylic acid esters, benzotriazoles, sulfonates, phosphoric esters, and mixtures thereof.

6. The cold and heat storage agent composition described at any one of items 1 to 5, wherein the hydrogen generation inhibitor is a mixture of a fatty acid amine salt and a phosphoric ester.

7. The cold and heat storage agent composition described at any one of items 1 to 6, further comprising an antioxidant.

8. The cold and heat storage agent composition described at item 7, wherein the antioxidant is a phenolic antioxidant.

9. An air-conditioning apparatus for vehicles which is equipped with an aluminum-cased cold and heat storage unit where the cold and heat agent composition described at any one of items 1 to 8 is enclosed.

Effects of Invention

According to the invention, it is possible to prevent the aluminum case from rusting and deforming due to generation of hydrogen, without decreasing the latent heat of melting.

DESCRIPTION OF EMBODIMENTS

[Base Material]

The base material used in the invention is a paraffin. Particularly, normal paraffin is preferred. Preferably used are paraffins with 12 to 18 carbon atoms, and more preferably paraffins with 14 to 16 carbon atoms. Those paraffins may be used alone or in combination.

In particular, it is preferable to use at least one selected from the group consisting of normal paraffins having 12 to 18 carbon atoms. It is more preferable to use at least one selected from the group consisting of normal paraffins having 14 to 16 carbon atoms.

The normal paraffin having 15 carbon atoms may preferably be contained in the base material in an amount of 60 mass % or more, more preferably 80 mass % or more, and still more preferably 90 mass % or more, and most preferably 95 mass % or more, based on the total mass of the base material.

In one preferred embodiment, the base material may comprise at least one normal paraffin selected from the group consisting of normal paraffins having 14 to 16 carbon atoms, and comprise the normal paraffin having 15 carbon atoms in an amount of 60 mass % or more, more preferably 80 mass % or more, and still more preferably 90 mass % or more, and most preferably 95 mass % or more, based on the total mass of the base material.

[Hydrogen Generation Inhibitor]

The hydrogen generation inhibitor used in the invention is at least one selected from the group consisting of organic inhibitors and passivators.

Generally, the organic inhibitors are polar group-containing compounds used for an oil-soluble rust inhibitor of grease. Typical examples include carboxylates and sulfonates.

Examples of the organic inhibitor that can be used in the invention include amine salts, carboxylic acid esters, benzotriazoles, sulfonates, and the like.

The above-mentioned amine salts include fatty acid amine salts, aromatic carboxylic acid amine salts, phosphoric ester amine salts and the like. In particular, fatty acid amine salts are preferable.

As the fatty acid for constituting the above-mentioned fatty acid amine salts, fatty acids having 4 to 22 carbon atoms are preferably used, and fatty acids having 8 to 18 carbon atoms are more preferably used. Saturated or unsaturated fatty acids may be used. In addition, straight-chain fatty acids, branched fatty acids, cyclic fatty acids and hydroxy fatty acids may be used. Specific examples of the fatty acids include stearic acid, palmitic acid, myristic acid, lauric acid, isostearic acid, octylic acid, undecylenic acid, oleic acid, hydroxystearic acid and the like. In particular, octylic acid and oleic acid are preferable.

The amine for constituting the above-mentioned fatty acid amine salts is not particularly limited, but preferably include saturated or unsaturated amines having 1 to 42 carbon atoms, more preferably, saturated or unsaturated amines having 4 to 22 carbon atoms. Specific examples of the amine include octylamine, laurylamine, myristylamine, stearylamine, behenylamine, oleylamine, tallow alkylamine, hardened tallow alkylamine, aniline, benzylamine, cyclohexylamine, diethylamine, dipropylamine, dibutylamine, diphenylamine, dibenzylamine, dicyclohexylamine, triethylamine, tributylamine, dimethyloctylamine, dimethyldecylamine, dimethylstearylamine, dimethyl tallow alkylamine, dimethyl hardened tallow alkylamine, dimethyloleylamine and the like. In particular, hardened tallow alkylamine and tributylamine are preferable.

The above-mentioned fatty acid amine salts may be used alone or in combination. Particularly, a fatty acid amine salt obtainable from octylic acid and tributylamine, a fatty acid amine salt obtainable from oleic acid and hardened tallow alkylamine, and mixtures of those amine salts are preferable.

As the above-mentioned aromatic carboxy acid amine salts, ammonium benzoate and the like may be used.

Specific examples of the amine for constituting the above-mentioned phosphoric ester amine salts include tertiary alkylamines, aromatic amines and the like.

As the phosphoric ester for constituting the above-mentioned phosphoric ester amine salts, acid phosphates, orthophosphates and the like can be used. In particular, acid phosphates are preferred.

Specific examples of the acid phosphates include methyl acid phosphate, butyl acid phosphate, dibutyl phosphate, monobutyl phosphate, 2-ethylhexyl acid phosphate, isodecyl acid phosphate, monoisodecyl phosphate and the like.

Specific examples of the orthophosphates include trimethyl phosphate, triethyl phosphate, tributyl phosphate, tris (2-ethylhexyl)phosphate, triphenyl phosphate, tricresyl phosphate, trixylenyl phosphate, cresyl diphenyl phosphate, 2-ethylhexyl diphenyl phosphate and the like. The above-mentioned phosphoric ester amine salts may be used alone or in combination.

The above-mentioned carboxylic acid esters include sorbitan ester, succinic acid half ester, lanolin, glycerin ester, glycol ester and the like. Of the above, succinic acid half ester is preferred. The above-mentioned carboxylic acid esters may be used alone or in combination.

The above-mentioned benzotriazoles include benzotriazole and derivatives thereof. Those benzotriazoles may be used alone or in combination.

As the sulfonic acid component for use in the above-mentioned sulfonates, petroleum sulfonic acid, alkylnaphthalene sulfonic acid, alkylbenzene sulfonic acid and the like can be used, for example. The amine salts and metallic salts of those sulfonic acids may be employed. Particularly, the metallic salts are preferred. The amine salts include ammonium salts, diethylenetriamine salts, ethylenediamine salts and the like. The metallic salts include calcium salts, magnesium salts, sodium salts, potassium salts, lithium salts, zinc salts and the like. The preferred salts are calcium salts, sodium salts and zinc salts. In particular, zinc salts are preferable. The above-mentioned sulfonates may be used alone or in combination.

Generally, the passivators are compounds that are used as water-soluble rust inhibitors for grease, such as chromates, nitrites, and molybdates.

The passivator that can be used in the invention includes phosphoric esters and the like.

As the phosphoric esters, acid phosphates and orthophosphates are preferable, and acid phosphates are more preferable.

Specific examples of the acid phosphates include methyl acid phosphate, butyl acid phosphate, dibutyl phosphate, monobutyl phosphate, 2-ethylhexyl acid phosphate, isodecyl acid phosphate, monoisodecyl phosphate and the like.

Specific examples of the orthophosphates include trimethyl phosphate, triethyl phosphate, tributyl phosphate, tris (2-ethylhexyl)phosphate, triphenyl phosphate, tricresyl phosphate, trixylenyl phosphate, cresyl diphenyl phosphate, 2-ethylhexyl diphenyl phosphate and the like.

The above-mentioned phosphoric esters may be used alone or in combination.

It is preferable to use the organic inhibitor and the passivator in combination as the hydrogen generation inhibitor. Especially, the combination of fatty acid amine salt with phosphoric ester, the combination of carboxylic acid ester with phosphoric ester, the combination of benzotriazole with phosphoric ester, and the combination of metal sulfonate with phosphoric ester are preferable.

In particular, use of fatty acid amine salt in combination with phosphoric ester is preferable. More specifically, the above-mentioned fatty acid amine salt may be composed of a fatty acid with 4 to 22 carbon atoms and a saturated or unsaturated amine with 1 to 42 carbon atoms; while the above-mentioned phosphoric ester may be acid phosphoric ester selected from the group consisting of methyl acid phosphate, butyl acid phosphate, dibutyl phosphate, monobutyl phosphate, 2-ethylhexyl acid phosphate, isodecyl acid phosphate, and monoisodecyl phosphate.

The ratio (by mass) of the fatty acid amine salt to the phosphoric ester may preferably be 10:90 to 90:10, more preferably 25:75 to 75:25, and most preferably 40:60 to 60:40.

The hydrogen generation inhibitor can be added to such a degree that the latent heat of melting of paraffin will not be affected, and the total amount of the hydrogen generation inhibitor may preferably be 0.01 to 10%, more preferably 0.05 to 5%, and most preferably 0.1 to 0.9%. The unit "%" herein used means mass % based on the total mass of the composition unless otherwise specified.

[Additives]

The cold and heat storage agent composition of the invention may further comprise additives generally used for the cold and heat storage agent so long as the latent heat of melting of paraffin will not be affected. To be more specific, antioxidants may be added.

As the antioxidant, phenolic antioxidants and amine antioxidants are preferable, and the former phenolic antioxidants are more preferable.

Examples of the phenolic antioxidant include 2,6-di-t-butyl-p-cresol (BHT), 2,2'-methylenebis(4-methyl-6-t-butylphenol), 4.4'-butylidenebis(3-methyl-6-t-butylphenol), 2,6-di-t-butyl-phenol, 2,4-dimethyl-6-t-butylphenol, t-butyl hydroxyanisole (BHA), 4,4'-butylidenebis(3-methyl-6-t-butylphenol), 4,4'-methylenebis(2,3-di-t-butylphenol), 4,4'-thiobis(3-methyl-6-t-butylphenol) and the like. Of the above, 2,6-di-t-butyl-phenol is preferable.

Examples of the amine antioxidant include N-n-butyl-p-aminophenol, alkyldiphenylamine, α-naphthylamine, N-phenyl-α-naphthylamine, phenothiazine and the like. Of the above, alkyldiphenylamine is preferred, and dioctyldiphenylamine is particularly preferred.

The above-mentioned antioxidants may be used alone or in combination.

The antioxidant can be added to such a degree that the latent heat of melting of normal paraffin will not be affected, and the total amount of the antioxidant may preferably be 0.01 to 10%, more preferably 0.05 to 5%, and most preferably 0.1 to 0.9%.

EXAMPLES

<Test Samples>

The compositions of test samples are as shown in the following Tables. In the Tables, the numerals represented as mass % are based on the total mass of the composition.

The cold and heat storage agent compositions of Examples and Comparative Examples were prepared by placing the materials shown in the following Tables into a beaker, heating the mixture to 50° C., stirring the mixture to obtain a solution, and then cooling the solution to room temperature. The obtained compositions were subjected to the tests in the following manners. The results are shown in Tables.

<Test Methods>

Rusting Test (1) 8.5 ml of the cold and heat storage agent separately prepared in Examples and Comparative Examples was placed into a sample vial.

(2) A piece of aluminum sheet (40×12 mm) was then put into the sample vial.

(3) At last, 8.5 ml of distilled water was put into the sample vial (cold and heat storage agent: distilled water=1:1), which caused the separation into two layers, with the lower layer being distilled water and the upper layer being the cold and heat storage agent.

(4) The sample vial was allowed to stand for 72 hours in a temperature controlled bath of 90° C. after the lid was closed. It was then observed whether the surface of the aluminum piece gathered rust or not by visual inspection. The aluminum piece with no rust was regarded as acceptable.

Hydrogen Generation Test (1) Two aluminum sheets (65 mm×50 mm) were prepared. The sheets were formed into a roll and subjected to ultrasonic cleaning using hexane and acetone. More specifically, one aluminum sheet was first rolled up to make a core cylinder with a height of 65 mm and then another sheet was rolled up over the core cylinder.

(2) After cleaning, the aluminum roll was put into a vial (with a diameter of 22 mm and a height of 75 mm).

(3) Then, 8.5 ml of each cold and heat storage agent was poured into the vial and the aluminum roll was rolled in the vial with the vial being tilted so that the aluminum roll might be uniformly wetted with the cold and heat storage agent.

(4) 8.5 ml of water was poured into the vial.

(5) The top of the vial was hermetically sealed using a septum with a washer.

(6) The sealed vial was allowed to stand at 80° C. for 90 hours. Then, a gas present in the top part was sampled using a syringe and subjected to gas chromatography to determine the amount of hydrogen generated. The amount of hydrogen of 0.2 cc or less was regarded as acceptable.

For the gas chromatography, a gas chromatograph GC-2010 (made by Shimadzu Corporation) with a column RT-Msieve (0.43 mm in diameter×30 m in length) and a thermal conductive detector (TCD) were used.

Acid value: Turbine oil oxidation stability test (in accordance with JIS K2514)

(1) Prior to the test, the acid value of each cold and heat storage agent was determined by the method of JIS K 2501.5, which was regarded as the acid value before test.

(2) After 50 g of each cold and heat storage agent was charged into a borosilicate glass tube (45 mm in outer diameter×600 mm in height), which was equipped with an oxygen introducing tube and a condenser (cooler), the glass tube was placed in a temperature controlled bath of 130° C.

(3) After cooling water was allowed to pass through the condenser to cool the upper part of the oxygen introducing tube, oxygen was introduced at a flow rate of 3 L/h.

(4) The glass tube was then allowed to stand at 130° C. for 120 hours, the acid value was determined as the acid value after test. The difference obtained by subtracting the acid value before test from that after test was regarded as an increase in acid value.

Melting Point and Latent Heat of Melting

Using a differential scanning calorimeter (DSC), the melting point and the latent heat of melting were determined under the following conditions:

Amount of sample: 5 mg

Flow rate of $N_2$: 100 mL/min.

Heating rate: 5° C./min.

TABLE 1

|  | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|---|---|
| Tetradecane (mass %) | 3 | 3 | 3 | 3 | 3 | 3 | 3 | 3 | 19 | 0 | 19 | 3 |
| Pentadecane (mass %) | 95 | 95 | 95 | 95 | 95 | 95 | 95 | 95 | 80 | 80 | 60 | 95 |
| Hexadecane (mass %) | 1 | 1 | 1 | 1 | 1 | 1 | 1 | 1 | 0 | 19 | 20 | 1 |
| Hydrogen generation inhibitor (mass %) | Fatty acid amine salt 0.4 | Fatty acid amine salt 0.8 | Succinic acid half ester 0.8 | Benzotriazole 0.8 | Zn sulfonate 0.8 | Phosphoric ester 0.8 | Fatty acid amine salt 0.6 | Fatty acid amine salt 0.4 | Fatty acid amine salt 0.4 | Fatty acid amine salt 0.4 | Fatty acid amine salt 0.4 | Fatty acid amine salt 0.4 |
|  | Phosphoric ester 0.4 | — | — | — | — | — | Phosphoric ester 0.2 | Phosphoric ester 0.4 | Phosphoric ester 0.4 | Phosphoric ester 0.4 | Phosphoric ester 0.4 | Phosphoric ester 0.4 |
| Antioxidant (mass %) | — | Phenolic type 0.2 | Phenolic type 0.2 | Phenolic type 0.2 | Phenolic type 0.2 | Phenolic type 0.2 | Phenolic type 0.2 | Phenolic type 0.2 | Phenolic type 0.2 | Phenolic type 0.2 | Phenolic type 0.2 | Amine type 0.2 |
| Melting point (° C.) | 10 | 10 | 10 | 10 | 10 | 10 | 10 | 10 | 9 | 11 | 7 | 10 |
| Latent heat of melting (KJ/Kg) | 184 | 184 | 184 | 184 | 184 | 184 | 184 | 184 | 183 | 185 | 152 | 184 |
| Rusting test | No rust | No rust | No rust | No rust | No rust | No rust | No rust | No rust | No rust | No rust | No rust | No rust |
| Amount of hydrogen generated (cc) | 0.0012 | 0.090 | 0.14 | 0.037 | 0.0011 | 0.17 | 0.0026 | 0.0003 | 0.0005 | 0.0003 | 0.0004 | 0.0010 |
| Increase in acid value (mgKOH/mg) | 82.3 | 0.06 | 0.05 | 0.06 | 0.11 | 0.05 | 0.07 | 0.09 | 0.11 | 0.07 | 0.10 | 0.09 |

Hydrogen generation inhibitors
Fatty acid amine salt: mixture of an amine salt composed of octylic acid and tributylamine and an amine salt composed of oleic acid and hardened tallow amine (having C18 predominantly)
Succinic acid half ester: mixture of mineral oil (40-50%), (tetrapropenyl)succinic acid (20-35%) and (tetrapropenyl)succinic acid 1,2-propanediol ester (20-35%) (The unit "%" in the Table means the percentage as the mixture.)
Zn sulfonate: mixture of mineral oil (60%) and dinonylnaphthalene Zn sulfonate (40%) (The unit "%" in the Table means the percentage as the mixture.)
Phosphoric ester: Acid phosphoric ester
Antioxidants
Phenolic antioxidant: 2,6-di-t-butyl phenol
Amine antioxidant: dioctyl diphenylamine

TABLE 2

|  | Comp. Ex. 1 | Comp. Ex. 2 | Comp. Ex. 3 | Comp. Ex. 4 |
|---|---|---|---|---|
| Tetradecane (mass %) | 4 | 20 | 3.8 | 3.8 |
| Pentadecane (mass %) | 95 | 80 | 95 | 95 |
| Hexadecane (mass %) | 1 | 0 | 1 | 1 |
| Hydrogen generation inhibitor (mass %) | — | — | — | — |
| Antioxidant (mass %) | — | — | Phenolic type 0.2 | Amine type 0.2 |
| Melting point (° C.) | 10 | 9 | 10 | 10 |
| Latent heat of melting (KJ/Kg) | 184 | 183 | 184 | 184 |
| Rusting test | Rusting | Rusting | Rusting | Rusting |
| Amount of hydrogen generated (cc) | 0.50 | 0.46 | 0.54 | 0.41 |
| Increase in acid value (mgKOH/mg) | 80.9 | 179.6 | 0.05 | 0.07 |

The invention claimed is:

1. A cold and heat storage agent composition comprising paraffin as a base material, at least one member selected from a group consisting of amine salts; benzotriazoles; sulfonates; phosphoric esters; and mixtures thereof as a hydrogen generation inhibitor, and an antioxidant, wherein the paraffin is contained in an amount of at least 80% by mass, the at least one member of hydrogen generation inhibitor is contained in an amount of 0.01 to 10% by mass, and the antioxidant is contained in an amount of 0.01 to 10% by mass, all mass percent being based on the total mass of the composition.

2. The cold and heat storage agent composition of claim 1, wherein the base material is at least one member selected from the group consisting of normal paraffins having 12 to 18 carbon atoms.

3. The cold and heat storage agent composition of claim 2, wherein the base material is at least one member selected from the group consisting of normal paraffins having 14 to 16 carbon atoms.

4. The cold and heat storage agent composition of claim 3, wherein the base material comprises the normal paraffin having 15 carbon atoms in an amount of 60 mass % or more based on the total mass of the base material.

5. The cold and heat storage agent composition of claim 1, wherein the hydrogen generation inhibitor is a mixture of a fatty acid amine salt and a phosphoric ester.

6. The cold and heat storage agent composition of claim 1, wherein the antioxidant is a phenolic antioxidant.

7. An air-conditioning apparatus for vehicles which is equipped with an aluminum-cased cold and heat storage unit where the cold and heat agent composition of claim 1 is enclosed.

8. A method for storing cold and heat comprising
providing a composition which comprises paraffin as a base material, at least one member selected from a group consisting of amine salts; benzotriazoles; sulfonates; phosphoric esters; and mixtures thereof as a hydrogen generation inhibitor, and an antioxidant, wherein the paraffin is contained in an amount of at least 80% by mass, the at least one member of hydrogen generation inhibitor is contained in an amount of 0.01 to 10% by mass, and the antioxidant is contained in an amount of 0.01 to 10% by mass, all mass percent being based on the total mass of the composition, and
enclosing the composition with an aluminum-cased cold and heat storage unit for an air-conditioning apparatus for vehicles.

9. The method of claim 8, wherein the base material is at least one member selected from the group consisting of normal paraffins having 12 to 18 carbon atoms.

10. The method of claim 9, wherein the base material is at least one member selected from the group consisting of normal paraffins having 14 to 16 carbon atoms.

11. The method of claim 10, wherein the base material comprises the normal paraffin having 15 carbon atoms in an amount of 60 mass % or more based on the total mass of the base material.

12. The method of claim 8, wherein the hydrogen generation inhibitor is a mixture of a fatty acid amine salt and a phosphoric ester.

13. The method of claim 8, wherein the antioxidant is a phenolic antioxidant.

* * * * *